(12) United States Patent
Dyer et al.

(10) Patent No.: US 8,174,235 B2
(45) Date of Patent: May 8, 2012

(54) SYSTEM AND METHOD FOR RECHARGING ELECTRIC VEHICLE BATTERIES

(75) Inventors: Christopher K. Dyer, Madison, NJ (US); Michael L. Epstein, Bedminster, NJ (US); Duncan Culver, Howell, NJ (US)

(73) Assignee: Lightening Energy, Dover, NJ (US)

( * ) Notice: Subject to any disclaimer, the term of this patent is extended or adjusted under 35 U.S.C. 154(b) by 0 days.

(21) Appl. No.: 13/190,197

(22) Filed: Jul. 25, 2011

(65) Prior Publication Data

US 2012/0043943 A1    Feb. 23, 2012

(51) Int. Cl.
*H02J 7/00*     (2006.01)
*B60K 6/20*     (2007.10)
*B60L 9/00*     (2006.01)

(52) U.S. Cl. .................. 320/109; 180/65.21; 701/22
(58) Field of Classification Search .................... 320/109
See application file for complete search history.

(56) References Cited

U.S. PATENT DOCUMENTS

| | | | |
|---|---|---|---|
| 5,395,708 A * | 3/1995 | Hall | 429/120 |
| 5,563,491 A | 10/1996 | Tseng | |
| 5,909,099 A | 6/1999 | Watanabe et al. | |
| 7,622,897 B2 * | 11/2009 | Eberhard et al. | 320/150 |
| 2005/0285563 A1 | 12/2005 | Yoneda | |
| 2010/0138092 A1* | 6/2010 | Kohn | 701/22 |
| 2010/0301810 A1* | 12/2010 | Biondo et al. | 320/155 |
| 2010/0315040 A1 | 12/2010 | Sakurai | |
| 2011/0043355 A1* | 2/2011 | Chander et al. | 340/455 |

* cited by examiner

*Primary Examiner* — M'Baye Diao
(74) *Attorney, Agent, or Firm* — Davidson, Davidson & Kappel, LLC

(57) ABSTRACT

A method for recharging an electric vehicle having an electric battery for powering a vehicle drive system is provided. The method includes recharging the electric vehicle during a first period at a first electrical power and recharging the electric vehicle during a second period shorter than the first period at a second electrical power higher than the first electrical power. The recharging includes delivering coolant to the electric vehicle to cool the electric battery during the second period. Other methods of recharging an electric vehicle are also provided.

17 Claims, 4 Drawing Sheets

SYSTEM AND METHOD FOR RECHARGING ELECTRIC VEHICLE BATTERIES

The present invention relates generally to electric vehicles and more specifically to a system and method for recharging electric vehicle batteries.

BACKGROUND OF INVENTION

There are many obstacles in developing a pure electric vehicle—an electric vehicle running solely on an electric vehicle battery, as opposed to a hybrid electric vehicle that also includes an internal combustion engine—having mass market appeal. One such obstacle is overcoming "range anxiety," which is the fear that the electric vehicle battery will run out of charge before the vehicle reaches its destination. Actual range varies with driver operation and frequently has been found to be worryingly less than expected, especially in heavily populated areas where traffic speed is variable, while the demands on the battery from non-motive peripherals are constant (air conditioning, heating, lighting, etc. . . . ). This varying range prevents electric vehicle users from accurately planning the actual transportation range of their electric vehicles even if the users know the percentage that the electric battery is charged at the beginning of a trip. In order to reduce range anxiety, attempts have been made to extend the range of the vehicle (i.e., "range extension") by increasing the amount of battery energy per vehicle. However, increasing the amount of battery energy per vehicle has been limited by the slow progress in the increase of practical energy density in large electric vehicle batteries. Additionally, although the use of hybrid electric vehicles reduces range anxiety, the use of electric and combustion drive systems together increases costs and does not fulfill the broader objectives for zero emissions and zero petroleum consumption.

BRIEF SUMMARY OF THE INVENTION

The present invention provides a method for recharging an electric vehicle having an electric battery for a vehicle drive system, the method comprising:

recharging the electric vehicle during a first period at a first electrical power; and recharging the electric vehicle during a second period shorter than the first period at a second electrical power higher than the first electrical power, the recharging including delivering coolant to the electric vehicle to cool the electric battery during the second period.

By providing for two separate recharging periods, such as a first period while the vehicle may for example be parked overnight in a garage and a second period at a roadside recharging station equipped for high speed recharging, range anxiety can be reduced.

Various embodiments of the above method may include one or more of the following advantageous features:

The first recharging period may occur without any external coolant being delivered to the vehicle. The first recharging period may be an overnight recharging period. The first recharging period may use a standard 120 or 240 volt supply to an electrical recharger connected to the vehicle battery. The electric vehicle may be a pure electric vehicle. The first electrical power may be less than 10 kW and may be at about 3 kW. The second electrical power may be more than 100 kW and may be at 300 kW. The first period may be greater than 8 hours and for example about 12 hours. The second period may be less than an hour and preferably less than 10 minutes and may be for example about 5 minutes. The second period may not fully recharge the battery, but may for example recharge the battery to a specific level, for example to 50% capacity or more preferably more than 80% capacity. The coolant may be gas or liquid. The coolant may utilize an existing electric vehicle coolant system or may preferably include external cooling during the second period. The coolant may be oil supplied to the battery at one liter per second or greater during the second cooling period. The coolant may be air supplied to the battery at 1600 cubic feet per minute or greater during the second cooling period. The coolant may be cooled by a refrigerating unit before being supplied to the battery.

The present invention also provides a vehicle capable of being recharged according to the above method and a roadside recharging station capable of recharging the electric vehicle during the second recharging period.

The present invention also provides a method for recharging an electric vehicle having an electric battery for a vehicle drive system, the method comprising:

recharging the electric battery using a roadside recharging station, the recharging including delivering coolant to the electric vehicle to cool the electric battery during the recharging.

The present invention also provides a method for recharging an electric vehicle having an electric battery for a vehicle drive system, the method comprising:

recharging the electric battery to at least a 50% capacity within ten minutes, the recharging including delivering coolant to the electric vehicle to cool the electric battery during the recharging.

The present invention also provides a method for recharging an electric vehicle having an electric battery for a vehicle drive system, the method comprising:

recharging the electric battery at 100 kW or more, the recharging including delivering coolant to the electric vehicle to cool the electric battery during the recharging.

BRIEF DESCRIPTION OF THE DRAWINGS

The present invention is described below by reference to the following drawings, in which.

DETAILED DESCRIPTION

Because the predictable range of an electric vehicle is difficult to determine and because increasing the practical energy density in large electric vehicle batteries is progressing slowly, increasing the availability of rapid roadside charging may encourage acceptance of pure electric vehicles. Roadside as used herein is defined as being any location that is accessible off a public roadway. For example, all gas stations accessible to the public are considered as being roadside according to the definition of roadside used herein. Combining the availability of rapid roadside charging with overnight charging, which itself does not reduce range anxiety because it does not extend the range of a vehicle in transit, may further increase the convenience and appeal of pure electric vehicles. Broader acceptance of pure electric vehicles may achieve economies of scale that may make electric vehicles and the underlying energy used to charge electric vehicle batteries dramatically less costly than conventional internal combustion drive vehicles or hybrid electric vehicles.

Embodiments of the present invention provide high power DC electric supply roadside charging stations capable of delivering up to 300 kW per electric vehicle (e.g., for 6 minutes charging of a 30 kWh electric vehicle battery) or more together with a coolant for cooling the electric vehicle battery during charging so that the battery does not overheat (up to ~50 kW of heat for example may be expected to be generated during 6 minutes of charge time). Conventional cooling techniques, such as cooling the surface or exterior of high voltage electric batteries, may not efficiently cool the heat generated by rapid charging stations delivering up to 300 kW or more per electric vehicle. Because heat generated by charging is primarily generated internally within the electric vehicle battery, cooling the external surface of the electric vehicle battery is inefficient and high temperature gradients within the battery stack itself may lead to battery damage and early failure, increasing costs and the likelihood of dangerous thermal runaway of the battery.

Further, embodiments of the present invention may allow for an efficient and safe method of internal battery stack cooling during high rate charging and may provide a unique and highly effective universal thermal management system. Additionally, the embodiments only add minimal onboard volume and weight to electric vehicles because the coolant and an optional heat exchanger are external to the electric vehicle and are applied during charging. In contrast to electric vehicles that exclusively use onboard cooling systems, having a coolant supply and heat exchanger external to the electric vehicle may increase the range of an electric vehicle and help diminish range anxiety.

Advantageously, an existing onboard coolant system may be modified to provide connections to the external coolant supply of the recharging stations of the present invention.

Figure 1A:
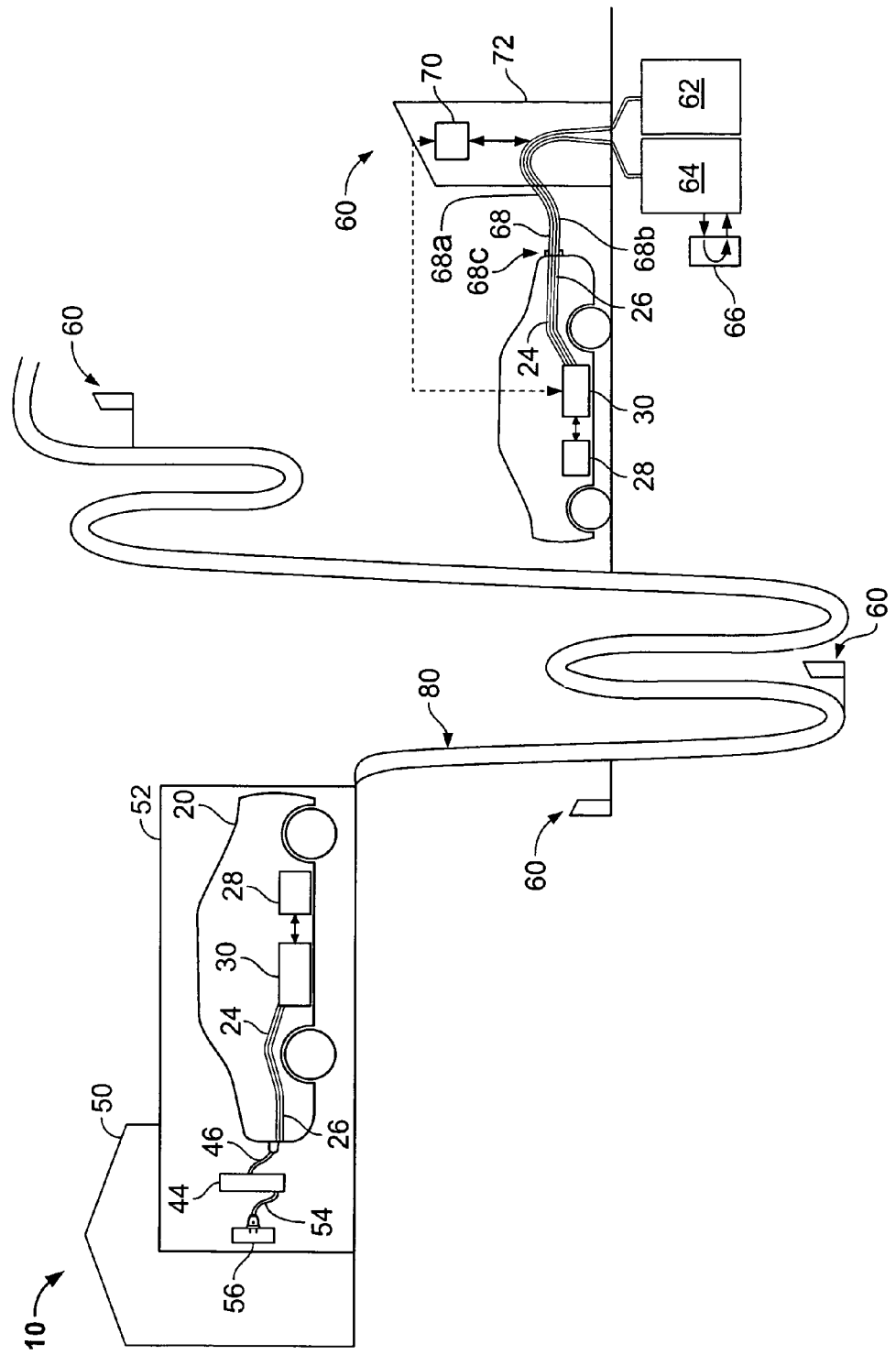
FIG. 1a schematically shows an electric vehicle battery charging system according to an embodiment of the present invention.

FIG. 1a schematically shows an electric vehicle battery charging system 10 according to an embodiment of the present invention. System 10 includes an electric vehicle 20. In the preferred embodiment of the present invention, electric vehicle 20 is a pure electric vehicle including an electric vehicle battery 30, but not an internal combustion engine. In an alternative embodiment, electric vehicle 20 may be a hybrid electric vehicle and may include an internal combustion engine working in cooperation with electric vehicle battery 30.

Figure 2:
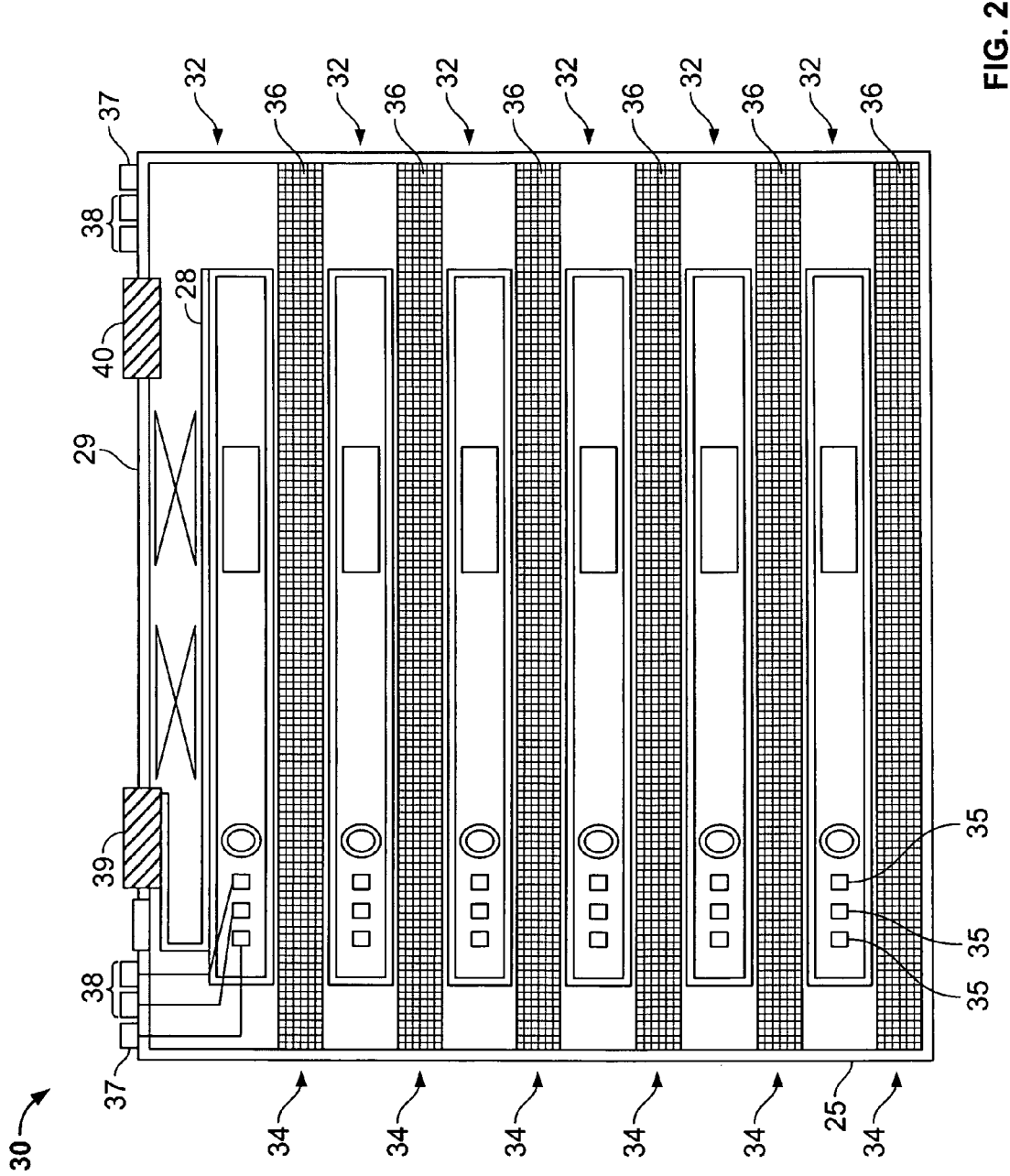
FIG. 2 schematically shows an electric vehicle battery for charging according to an embodiment of the present invention.

FIG. 2 shows one exemplary embodiment of electric vehicle battery 30 in more detail. Electric vehicle battery 30 may be a modular battery including a plurality of battery cells 32 separated by a plurality of internal channels 34 in battery 30 in between cells 32. Channels 34 are preferably at least partially filled with porous compressible interconnectors 36, which act to provide an electrically-conducting interconnection between adjacent cells 32 while also allowing coolant to be passed through internal channels 34 between cells 32 to cool cells 32 during charging. In preferred embodiments, battery 30 is the battery disclosed in U.S. Pub. No. 2009/0239130, which is hereby incorporated by reference herein, with interconnectors 36 and cells 32 being formed in the same manner as the interconnectors and the planar cell modules, respectively, disclosed in U.S. Pub. No. 2009/0239130. Cells 32 each include a positive and a negative electrode, with the positive electrodes connecting to a positive terminal 39 and the negative electrodes connecting to a negative terminal 40.

Compressible interconnectors 36 can be made any material that has sufficient properties such as, for example a wire mesh, metal or carbon fibers retained in a compressible elastomeric matrix, or an interwoven conducting mat, consistent with the requirement for a compressible flexible electrically-conducting interconnection between adjacent cell plate module surfaces while maintaining sufficient spacing for coolant to be passed through internal channels 34 to cool cells 32 during charging. In the illustrative example in FIG. 2, six cells 32 are contained in a stacked array within an enclosure 25 which, in this embodiment, is of rectangular cross section. Although only six cells 32 are shown, battery 30 may include tens to hundreds of cells interconnected to make a very high-voltage battery stack. Enclosure 25 includes inputs and outputs, which may be automatically opened or closed, allowing coolant to be passed through channels 34.

In alternative preferred embodiments, interconnectors 36 may not be electrically and/or thermally conductive, but may simply be provided between cells 32 to space cells 32 apart from each other to form channels 34 between cells. In these embodiments, cells 32 may be formed as insulating pouches with conductive tabs at the ends thereof which allow coolant passing through channels 34 formed by interconnectors 36 to cool cells 32.

The power terminals 39, 40 connect internally to the ends of the cell module battery stack through an internal power bus 28 for the positive terminal 39 and electrically conductive enclosure 25 may serve as a negative bus 29 to negative terminal 40 or a negative bus may additionally be provided for negative terminal 40. Enclosure 25 may provided with external multipin connectors 37, 38, which may be electrically connected by sense lines to electrical feed throughs 35, for monitoring cell voltage and cell temperature, respectively. One set of multipin connectors 37, 38 may be provided for each cell 30. In order to provide cell voltage and cell temperature information for controlling the charging of battery 30, multipin connectors 37, 38 may transmit voltage and cell temperature measurements to controller 28 (FIG. 1a).

Referring back to FIG. 1a, electric vehicle battery 30 may be coupled to controller 28, which may determine the state of battery 30 and regulate the operation and charging of battery 30 accordingly. In order to charge battery 30 during extended period of nonuse, battery 30 may be connectable to a charger 44 that is plugged in via a cord 54 having a plug to an electrical outlet 56, for example a standard 120 volt or 240 volt AC electrical outlet. Outlet 56 may be present in a garage 52 of a home 50, or any other residence or business for overnight charging in order to fully or partially charge electric vehicle battery 30. A charging cord 46 extending from charger 44 to battery 30 may be detachably coupled to an electric conduit 24 in vehicle 20 that is coupled to terminals 39, 40 (FIG. 2) in order to the fully or partially charge electric vehicle battery 30. Due to the limited rate at which battery 30 may be charged by electrical outlet 56 via charger 44, providing external coolant into battery 30 during overnight charging via electrical outlet 56 is not necessary.

Figure 1B:
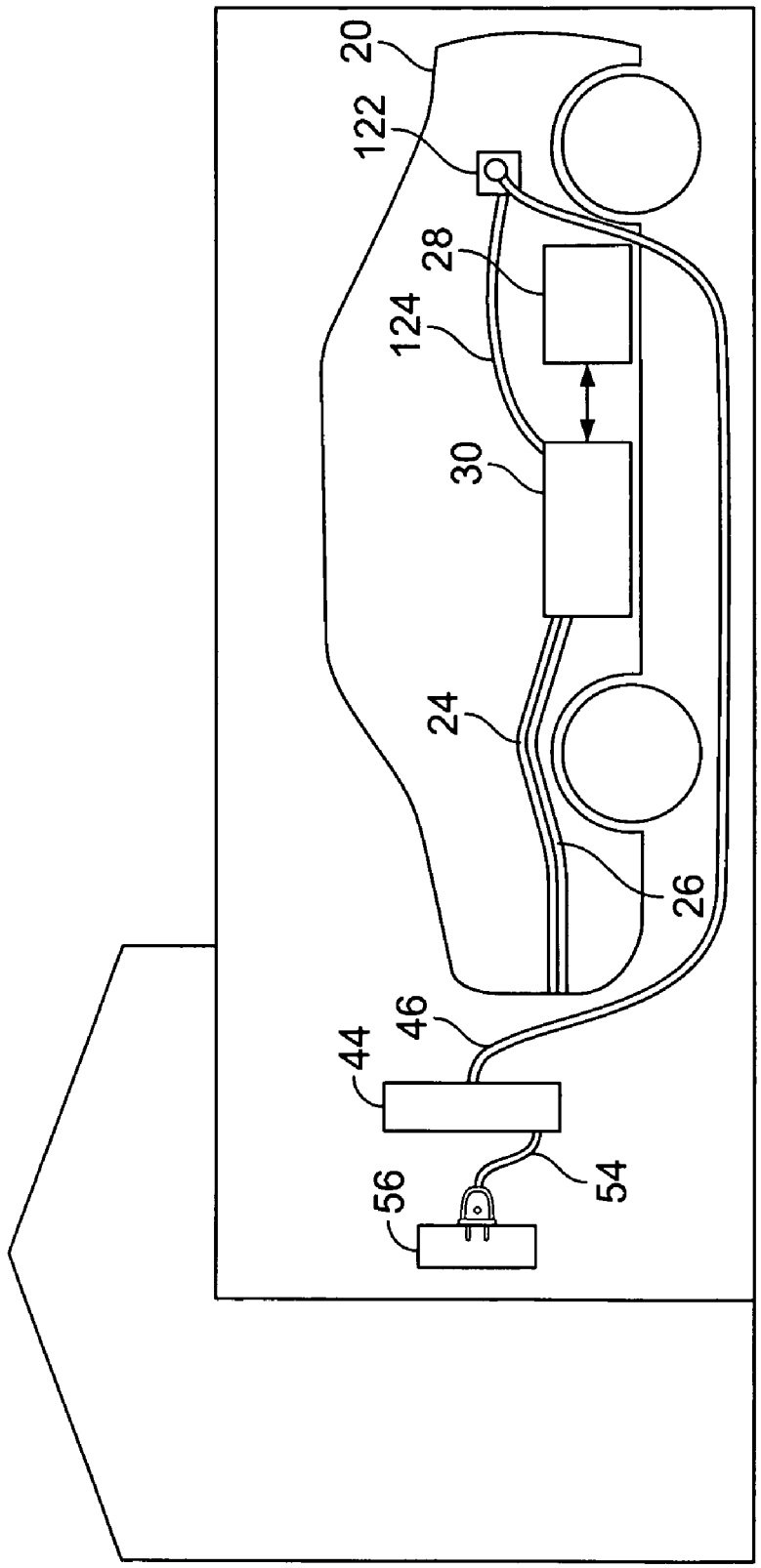
FIG. 1b shows an alternative embodiment of an electric vehicle for use in the electric vehicle battery charging system of the present invention.

FIG. 1b shows an alternative embodiment of an electric vehicle 20' for use in electric vehicle battery charging system 10 of the present invention. Electrical vehicle 20' is configured in the same manner as electric vehicle 20 shown in FIG. 1a; however, instead of charging cord 46 being detachably coupled to electric conduit 24 as with vehicle 20, charging cord 46 is inserted into a separate receptacle 122 that is coupled to terminals 39, 40 (FIG. 2) via an electrical conduit 124.

For example, charger 44 may be a 3 kW charger and may fully charge a completely discharged 600V, 40 Ah, 24 kWh embodiment of electric vehicle battery 30 by charging the battery for approximately eight hours. A vehicle 20 including the 600V, 40 Ah, 24 kWh embodiment of electric vehicle battery 30 may optimistically travel approximately 4 miles per kWh and may have a range of approximately 96 miles. In light of these limitations of the charge life of battery 30, further charging of battery 30 may be necessary for trips beyond the range of battery 30. Accordingly the driver of vehicle 20 may have to recharge battery 30 during the days when the driver needs to travel more than 96 miles.

In order to allow electric vehicle battery 30 to be rapidly charged between overnight or standard charges, rapid charging stations 60 may be strategically located along public roadways 80 to allow the driver of vehicle 20 to confidently drive vehicle 20 on days when the driver knows that there is at least a chance the driver may need to exceed the range of battery 30. In a preferred embodiment rapid charging stations 60 are for example the rapid charging stations disclosed in U.S. Publication No. 2012/0043935, having the same inventors and filed on the same date as the present application, the entire disclosure of which is hereby incorporated by reference herein. Vehicle 20 may for example include features similar to those of the vehicles disclosed in U.S. Publication No. 2012/0043935 and/or U.S. Application Serial No. 13/190,235, filed on the same date as the present application, the entire disclosure of which is also hereby incorporated by reference herein.

Rapid charging station 60 may include a high power charging source 62 for rapidly charging battery 30 of vehicle 20 and a coolant source 64 for supplying coolant internally to battery 30 via channels 34 (FIG. 2) as battery 30 is rapidly charged by high power charging source 62, which in a preferred embodiment is a high powered DC power source. In preferred embodiments, high power charging source 62 may be a battery or super capacitor capable of discharging at high rates and being recharged with off-peak electricity, which is cheaper and less likely to cause power grid disruptions. The driver of vehicle 20 may pull into any of rapid charging stations 60 (only one of which is shown in detail in FIG. 1a for clarity), turn off vehicle 20 and insert a connector 68c on an end of a supply line 68 of rapid charging station 60 into a corresponding receptacle of vehicle 20 that is accessible from the outside of vehicle 20. In the embodiment shown in FIG. 1a, supply line 68 extends outside of a base portion 72 and includes a cable 68a coupled to high power charging source 62 and a hose 68b coupled to coolant source 64. The driver may insert connector 68c into the receptacle of vehicle 20 such that connector 68c is temporarily locked into place in the receptacle. The driver may then hit a power button, which may be on either connector 68c or base portion 72, instructing rapid charging station 60 to begin charging battery 30. After rapid charging station 60 is instructed to begin charging, rapid charging station 60 provides current from high power charging source 62 and coolant from coolant source 64 to battery 30 until battery 30 is sufficiently charged. In one preferred embodiment of the present invention, rapid charging station 60 delivers up to 300 kW to vehicle 20 and may accordingly charge a 600 Volt, 30 kWh embodiment of battery 30, in approximately 6 minutes. During the approximately 6 minutes of rapid charging of the 30 kWh embodiment of battery 30, approximately 50 kW of heat may be generated by cells 32 of the 30 kWh embodiment of battery 30. Without coolant being provided preferably internally to the 30 kWh embodiment of battery 30 during such rapid charging, battery 30 may become permanently damaged or destroyed due to an undesirable rise in temperature. Accordingly, sufficient coolant may be pumped from coolant source 64 through supply line 68 and coolant conduit 26 into battery 30 as current is supplied from high power charging source 62 through supply line 68 and electrical conduit 24 to absorb a portion of the heat generated within battery 30 and prevent battery 30 from being damaged or destroyed during the charging.

In an alternative embodiment, in particular for use when the coolant provided by coolant source 64 is oil or another liquid, but also possibly when the coolant provided is air or another gas, a coolant return conduit may be provided in vehicle 20 at the output ends of channels 34 to cycle the coolant that has been passed through battery 30 back through supply line 68 into coolant source 64. In this alternative embodiment, an additional return hose, either integral with supply line 68 or independent of supply line 68, may also be provided between vehicle 20 and rapid charging station 60 to recycle the coolant back into coolant source 64. Rapid charging station 60 may then be provided with a heat exchanger for removing the heat generated within battery 30 from the recycled coolant.

In another alternative embodiment, instead of rapid charging station 60 including single supply line 68, current from high power charging source 62 and coolant from coolant source 64 may be provided to vehicle 20 separately, such that two independent supply lines are provided between rapid charging station 60 and vehicle 20. For example, the two independent supply lines may be a cable coupled to high power charging source 62 having a connecting plug for removable attachment to an electrical receptacle coupled to electrical conduit 24 and a hose coupled to coolant source 64 having a connecting nozzle for removable attachment to a coolant receptacle coupled to coolant conduit 26. In further embodiments of the present invention a supply line may only be used for coolant source 64 and high power charging source 62 may wirelessly charge battery 30 through inductive charging or magnetic resonance charging. In another alternative embodiment, a separate coolant return may be provided and connected to a heat exchanger in rapid charging station 60.

A controller 70 may be provided for controlling the amount of charge supplied to battery 30 from high power charging source 62 and to control the amount of coolant supplied to battery 30 from coolant source 64 (and back into coolant source 64 in embodiments where the coolant is recycled). As vehicle 20 is connected to rapid charging station 60 for charging battery 30, controller 70 may be brought into communication with controller 28 of battery 30 such that controller 70 can regulate the supply of charge from high power charging source 62 and the supply of coolant from coolant source 64 according to the present state of battery 30. For example, if due to the weather conditions or the manner in which vehicle 20 has been driven, battery 30 is warmer or cooler than usual (for example as measured by connectors 37, 38 shown in FIG. 2), the supply rate and/or temperature of coolant from coolant source 64 may be increased or decreased accordingly. Also, if battery 30 is partially charged and only needs to be charged a small amount, controller 70 can limit the supply of charge from high power charging source 62 to below the maximum charging rate and adjust the flow rate and/or temperature of coolant from coolant source 64 to a corresponding value. Controller 70 may include a memory that correlates the amount of coolant to be supplied to the charge supplied and also optionally to the temperature of battery 30. Controller 70 may also provide information to an operator of roadside charging station 60 for charging an amount owed to the vehicle owner, for example in calculating the charge delivered and the price to be charged for the roadside recharging. Controller 28 may also provide controller 70 with information regarding the present chemistry of battery 30, as sensed at battery 30, and controller 70 may control the charging and cooling of battery 30 based on the chemistry of battery 30 to allow for the safest protocols for recharging battery 30. For example, an older battery 30 may not take the fastest recharging rates or may have a slightly different chemistry and may be charged by rapid charging station 60 according to preset chemistry charging and cooling rates stored in controller 70.

In one example, battery 30 is a 300 Volt electric vehicle battery weighing 100 kg and after a full charge may supply 30 kWh to vehicle 20. In this example, high power charging source 62 fully charges battery 30 in ten minutes, at 180 kW and battery 30 includes one hundred 3V cells 32 each having a resistance of 1 milliohm. The charging generates approximately 36 kW of heat for 10 minutes (~6 kWh). In order to sufficiently cool battery 30 during such charging to maintain an acceptable temperature of approximately 45 degrees Celsius, coolant source 64 may provide oil (supplied at 20 degrees Celsius) at a rate of at least 0.73 liters per second (44 liters per minute) or may provide air (supplied at 0 degrees Celsius) at a rate of at least 1800 cubic feet per minute. Across the industry, electric battery charge and discharge rates are referred to using a normalization called a C-rate (C=capacity of the battery). Regardless of the size of electric battery, a 1C rate on charge or discharge means the battery is fully charged or discharged or discharged in 1 hour. For example a C/8 rate would indicate an eight hour charge or discharge and 2C rate would indicate a half hour charge or discharge. Accordingly, for the above example of charging in ten minutes, battery 30 would have a C-rate of 6C.

In another example, to charge a 600 Volt, 24 kWh embodiment of battery 30 in six minutes, high power charging source 62 may be a 240 kW charger, delivering 400 Amps at 600 Volts (DC) for six minutes. Due to substantial heat losses, the power delivered may have to be much higher than if the charging was completely efficient. For example, if there were two hundred cells of 3 Volts each, with a resistance each of one milliohms, there may be 32 kW of heat generated, and an additional minute of charging (approximately seven minutes total) may be necessary.

In one embodiment, instead of fully charging battery 30 to 100% of its charge capacity using high power charging source 62, battery 30 may be charged by high power charging source 62 to 80% of its charge capacity in approximately five minutes. This approach of 80% charging may prevent overvoltages in some cells of battery 30. Charging over 80% of the charge capacity of battery 30 may then be accomplished if desirable by tapering down the current supplied by charging source 62 after battery 30 is charged to 80% of its charge capacity. In order to charge the 600 Volt, 24 kWh embodiment of battery 30, after being fully discharged, having two hundred cells of 3 Volts each, with a resistance each of one milliohms, to 80% capacity (19.2 kWh) in five minutes, 2.7 kWh of heat (32 kW over five minutes ~$10^7$ Joules) would be generated in battery 30. In order to sufficiently remove 2.7 kWh of heat in five minutes, oil may be passed internally through channels 34 of battery 30 at a minimum of 40 liters/min or air may be passed internally through channels 34 of battery 30 at a minimum of 1600 cubic ft/min. In order to compensate for the inherent delay in heat transfer to the coolant, in preferred embodiments of the present invention, oil or air is passed through at higher rates than the minimum. In these embodiments, for the above mentioned 600 Volt battery, oil may be passed internally through channels 34 of battery 30 at approximately 50 to 200 liters/min or air may be passed internally through channels 34 of battery 30 at approximately 2000 to 8000 cubic ft/min. The cooling rates for larger or smaller batteries may be proportionately higher or lower, respectively.

In further embodiments, a refrigeration unit 66 may be provided for further cooling the air or oil used to cool battery 30. In particular, refrigeration unit 66 may be particularly advantageous for cooling air and may allow air to be passed internally through channels 34 of battery 30 at rates lower than approximately 2000 to 8000 cubic ft/min.

After battery 30 is charged by rapid charging station 60, battery 30 may be internally air-cooled or heated by passing air through interconnectors 36. The air may be may be supplied using blown air from an existing on-board air conditioning or air-heating system (HVAC) on vehicle 20. For instance, air-blown heating may be used during the coldest days of winter months for efficient and rapid battery warm up, which is advantageous because batteries loose considerable capacity (and therefore driving range) at low temperatures. Then, as the battery heats up to the normal operating temperature, any waste heat generated thereafter may be used for space heating or cooling (e.g., via a small heat pump), thereby utilizing otherwise wasted energy (further extending the range of vehicle 20) and controlling the rising of the temperature of battery 30 during accelerating and braking transients. In an alternative embodiment, after battery 30 is charged by rapid charging station 60, battery 30 may be internally liquid-cooled or liquid-heated by passing liquid through interconnectors 36 from an on-board liquid heat-exchanger cooled or heated respectively by an on-board refrigeration or heating system which may also serve to control vehicle space cooling and heating.

In one embodiment of the present invention, coolant conduit 26 and the coolant return conduit, if provided, may be incorporated into the HVAC system of vehicle 20. Accordingly, coolant conduit 26 and the coolant return conduit may be used for thermal management of battery 20 to pass coolant through channels 34 (FIG. 2) during the operation of vehicle 20 and then for cooling of battery 30 with coolant supplied by rapid charging station 60 and passed through channels 34 during rapid recharging. Switching valves could be provided to alternately couple the coolant conduit 26 and the coolant return conduit to the HVAC system during driving and to supply line 68 during charging.

Additionally, for example, the thermal energy removed from battery 30 by the coolant passing through battery 30 may be converted into electricity in either vehicle 20 or rapid charging station 60. For example, turbine or thermoelectric devices of vehicle 20 or vehicle 20' or turbine or thermoelectric devices in rapid charging station 60 or rapid charging station 60' may be coupled to outlets of channels 34 to recapture energy in the coolant downstream of battery 30.

In preferred embodiments, battery 30 contains nanoscale particles which fundamentally allow for high charging rates. The nanoscale particles may be coated with a thin layer of carbon. For example, anodes of cells 32 may be formed of lithium titanium oxide (LTO) nanoparticles and cathodes of cells 32 may be formed of lithium iron phosphate (LFP) nanoparticles, such that battery 30 may be rapidly recharged at up to the 3 minute rate (i.e., 20C-rate) and may also cycle for many thousands of times such that no battery replacement may be required during the life of vehicle 20 or 20'. For example, the use of such nanoparticles in battery 30 when combined with the present invention which limits the temperature rise in battery 30 may allow battery 30 to be rapidly charged more than 10,000 times, and with a range of 100 miles, battery 30 theoretically may have a life of more than 1,000,000 miles. Such battery longevity would yield a high salvage value for battery 30 for example for use in new vehicles. Such battery longevity would also provide environmental and strategic benefits for the United States by reducing battery raw materials importation and processing thereof.

Coolants other than air or oil may also be supplied by coolant source 64. For example, flowable liquid or gaseous materials having optimal heat capacity may used. The coolant may be supplied with additives to increase heat exchange capabilities. In one preferred embodiment, the coolant is electrically insulating.

Embodiments of the present invention may also be applied to hybrid electric vehicles and other large battery applications benefiting from rapid charging with off-board or external cooling. For example, rapid charging stations may be used for charging and cooling trains, planes, along with military vehicles, including armament and battlefield applications such as large robots, tanks, drones, M777 howitzers and rail guns, etc. . . . , all of which may benefit from the ability of fast battery recharges, with the amount of coolant being supplied being proportional to the size of the battery and the desired speed of the recharge. As used herein, vehicle is defined broadly as encompassing any piece of mechanized equipment.

In further embodiments, which may be particularly useful for military applications, rapid charging stations 60, 60' may be formed as mobile charging stations, so-called mules, that may be moved from one place to another in situations where stationary rapid charging stations may not be accessed. Accordingly, the mobile charging stations may be integral with a vehicle, for example a tank, airplane or truck, may be movable onto a vehicle and/or be movable by a vehicle.

Figure 3:
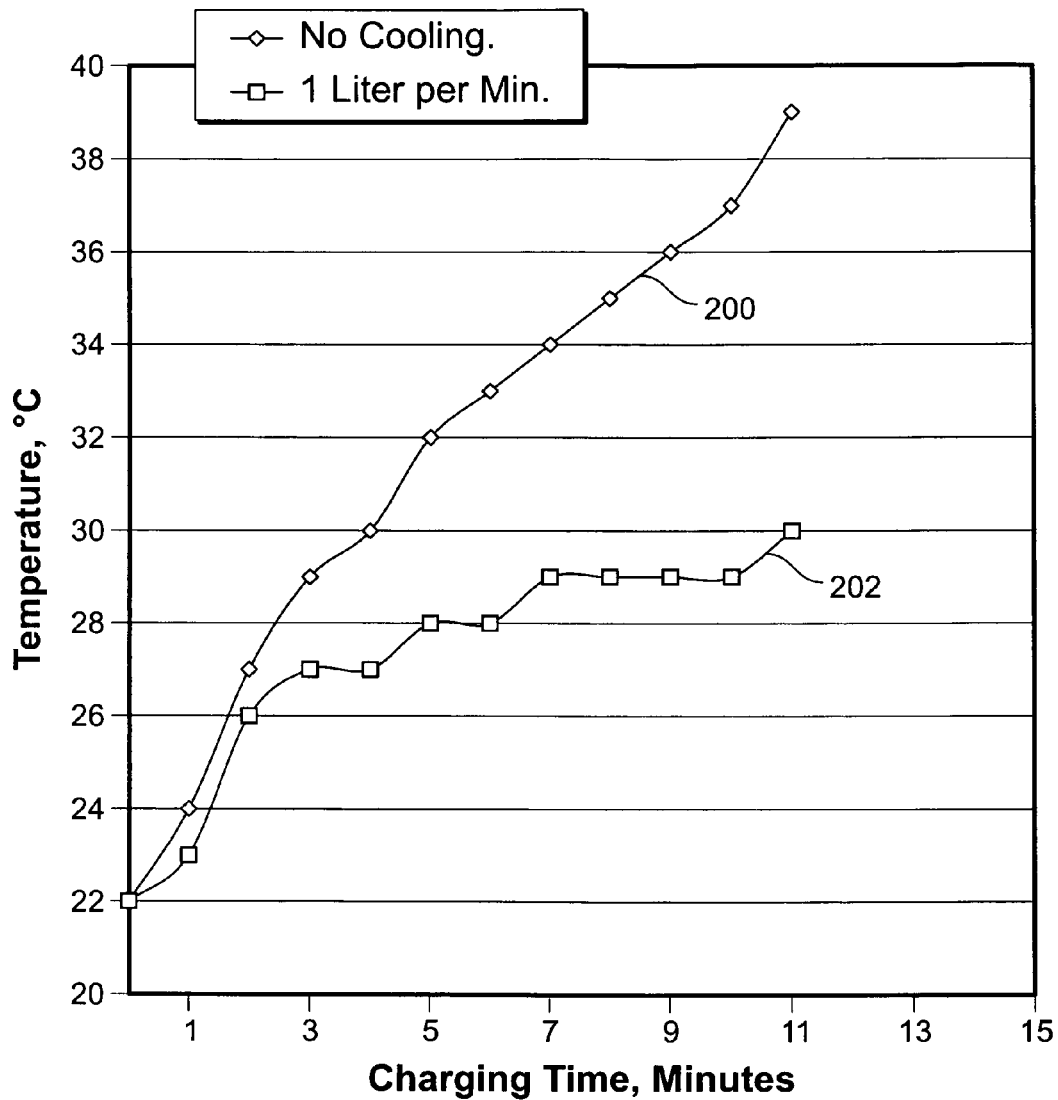
FIG. 3 shows a graph plotting battery temperature versus time for a three cell battery rapidly charged at a 20 minute rate.

FIG. 3 shows a graph plotting battery core temperature versus time for a three cell battery rapidly charged at a 20 minute rate (i.e., 3C-rate). The three cell battery includes electrically conductive interconnectors 36 (FIG. 2) between the cells. A line 200 plots the temperature of the three cell battery versus time without any coolant flowing through interconnectors 36 and a line 202 plots the temperature of the three cell battery versus time with coolant being pumped into the battery, through interconnectors 36, at a rate of one liter per minute. In this experiment, the coolant used was a commercial heat-transfer fluid, Paratherm LR, a paraffinic hydrocarbon with a broad operating range (i.e., between −50 and 230 degrees Celsius). Paratherm LR has a specific resistance of around 10E14 ohm cm, and the dielectric breakdown voltage (per ASTM D1816-04, 0.1 inch gap) is over 22 kV, which was sufficient to prevent damage to the electrical components of the battery for example by electrical shorting which would also cause inefficient charging. The graph illustrates that pumping coolant into a battery limits the temperature of the battery. As shown in FIG. 3, without cooling, the battery is heated from 22 degrees Celsius to 30 degrees Celsius in approximately 4 minutes and is heated to approximately 39 degrees Celsius in approximately 11 minutes. In contrast, with coolant being pumped through the battery, the battery does not reach 30 degrees Celsius until the battery has been heated for 11 minutes. Accordingly, the temperature increase in the cooled battery is less than half of the temperature increase of the uncooled battery (8 degrees Celsius vs. 17 degrees Celsius). Further properties of Paratherm LR are shown in the below chart.

| Chemical name | Paraffinic hydrocarbon |
| --- | --- |
| Maximum Recommended Film Temperature | 500° F./260° C. |
| Maximum Recommended Operating Temperature | 450° F./232° C. |
| Minimum Operating Temperature 20 cPs (20 mPa-s) | −58° F./−50° C. |
| Minimum Start-up Temperature 300 cPs (300 mPa-s) | −112° F./−80° C. |
| Viscosity at 60° F. cSt (mm$^2$/sec) | 2.4 |
| Density at 60° F./15.5° C. lb/gal (kg/m$^3$) | 6.4 (766) |
| Flash Point Closed Cup (D56) | >130° F./54° C. |
| Autoignition Temperature (maximum 10 sec ignition delay) | >500° F./260° C. |
| Boiling Point (14.7 psia/101 kPa) | 397° F./202° C. |
| Vapor Pressure @ maximum operating temperature psia (kPa) | 21 (145) |
| % Volume expansion over recommended operating temperature per 100° F. (° C.) | 6.8 (12.2) |
| Average Molecular Weight | 160 |
| Dielectric Breakdown voltage D1816-04 (kV, 0.1" gap) | 22.15 |
| Dielectric Constant (1 KHz) D924-04 | 2.03 |
| Dissipation Factor (1 KHz) D924-04 | 0.00001 |
| Volume Resistivity at 100 V (Ω-cm) D257-07 | $1.84 \times 10^{14}$ |
| Heat of combustion (approximate) BTU/lb (kJ/kg) | 20,000 (46,300) |
| Heat of vaporization (approximate) Btu/lb (kJ/kg) | 113 (262) |

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for recharging an electric vehicle having an electric battery for powering a vehicle drive system, the method comprising:
    recharging the electric battery of the electric vehicle during a first period at a first electrical power; and
    recharging the electric battery of the electric vehicle during a second period shorter than the first period at a second electrical power higher than the first electrical power, the recharging including delivering coolant to the electric vehicle to cool the electric battery during the second period.

2. The method as recited in claim 1 wherein the first recharging period occurs without any external coolant being delivered to the vehicle.

3. The method as recited in claim 1 wherein the first recharging period is an overnight recharging period.

4. The method as recited in claim 1 wherein the first recharging period uses a standard 120 or 240 volt electrical connection to recharge the vehicle battery.

5. The method as recited in claim 1 wherein the electric vehicle is a pure electric vehicle.

6. The method as recited in claim 1 wherein the first electrical power is less than 10 kW.

7. The method as recited in claim 1 wherein the second electrical power is more than 100 kW.

8. The method as recited in claim 1 wherein first period is at least 8 hours.

9. The method as recited in claim 1 wherein the second period is less than an hour.

10. The method as recited in claim 9 wherein the second period is less than 10 minutes.

11. The method recited in claim 1 wherein the second period charges the battery to at least 50% capacity.

12. The method as recited in claim 1 wherein the coolant utilizes an existing electric vehicle coolant system.

13. The method as recited in claim 1 wherein the coolant is gas supplied at 100 cubic ft/min or greater.

14. The method as recited in claim 1 wherein the coolant is liquid supplied at 0.1 liters/sec or greater.

15. The method as recited in claim 1 wherein the coolant is cooled by a refrigerating unit before being supplied to the battery.

16. A vehicle recharged according to the method as recited in claim 1.

17. A roadside recharging station capable of recharging the electric vehicle recited in claim 16 during the second recharging period.

* * * * *